Oct. 29, 1940.  L. W. ATCHISON  2,219,833

REFRIGERATOR

Filed May 19, 1939

Inventor:
Leonard W. Atchison,
by Harry E. Dunham
His Attorney.

Patented Oct. 29, 1940

2,219,833

UNITED STATES PATENT OFFICE 2,219,833

REFRIGERATOR

Leonard W. Atchison, Schenectady, N. Y., assignor to General Electric Company, a corporation of New York Application May 19, 1939, Serial No. 274,513

5 Claims. (Cl. 62—1)

My invention relates to refrigerators and more particularly to food storage receptacles associated with the refrigerated compartments of domestic refrigerators for storing meats and the like.

The air in the refrigerated compartment of a domestic type refrigerator is usually maintained at an average temperature between 40° F. and 45° F. for general refrigeration purposes. An average temperature within this range may be maintained in a refrigerated compartment by the convection currents of air set up therein by a cooling unit or refrigerant evaporator located within the refrigerated compartment. In the usual refrigerator this result is obtained by maintaining the temperature of the surface of the evaporator considerably below 30° F., for example approximately 20° F. While a storage atmosphere having a temperature within the range maintained is satisfactory for the preservation of foods in general, certain types of foods, such for example as meats and fish may be more satisfactorily preserved in a storage atmosphere having a lower temperature range. Therefore, it is an object of my invention to provide an improved arrangement of a food storage receptacle in the refrigerated compartment of a refrigerator which is adapted to maintain a storage atmosphere therein having a lower temperature than the air circulated in the refrigerated compartment.

Another object of my invention is to provide a food storage receptacle for the refrigerated compartment of a refrigerator with means for impeding heat transfer thereto from the walls of the refrigerated compartment or bodies stored therein.

Further objects and advantages of my invention will become apparent as the following description proceeds, and the features of novelty which characterize my invention will be pointed out with particularity in the claims annexed to and forming a part of this specification.

Figure 1:
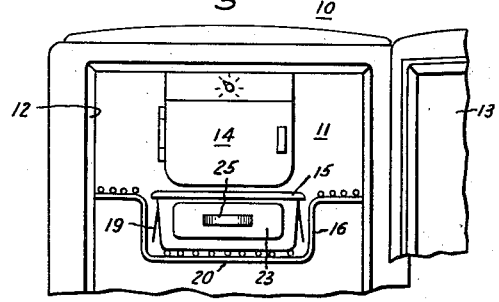
Figure 2:
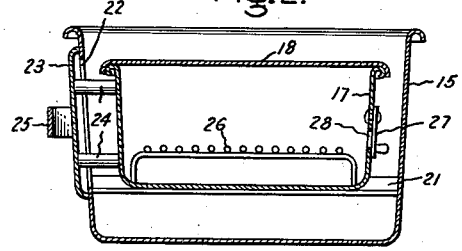
Figure 3:
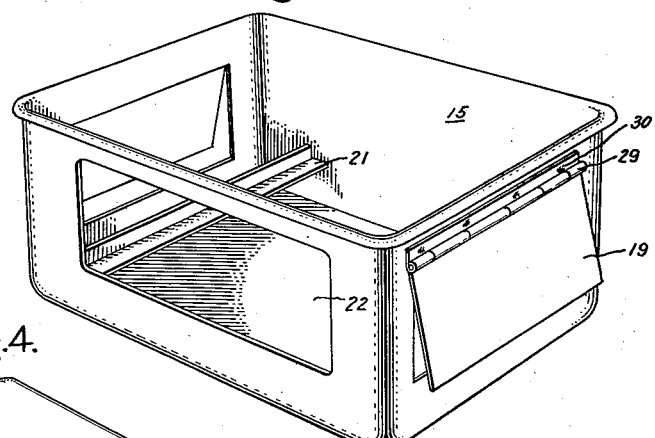
Figure 4:
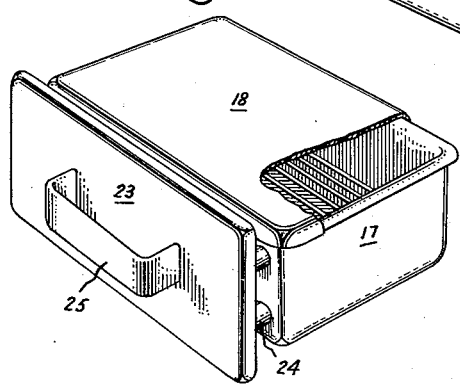

For a better understanding of my invention reference may be had to the accompanying drawing in which Fig. 1 is a fragmentary front elevational view of a domestic type refrigerator having a storage compartment provided with a food storage receptacle embodying my invention; Fig. 2 is an enlarged sectional view of the food storage receptacle and shield member illustrated in Fig. 1; Fig. 3 is an enlarged perspective view of the shield member shown in Fig. 1; and Fig. 4 is an enlarged perspective view, partly broken away, of the food storage receptacle illustrated in Figs. 1 and 2.

I have illustrated a refrigerator 10 provided with side walls defining a food storage compartment 11, a front wall of the refrigerator being provided with a door opening 12 adapted to be closed by a suitable heat insulated door 13. I have illustrated a refrigerant evaporator or cooling unit 14 secured to the upper wall of the food compartment 11 and a combined drip tray and shield member 15 is supported below and adjacent to cooling unit 14 as by means of a shelf 16. A food storage receptacle 17 having a cover 18 is shown removably arranged within the shield member 15, the side and bottom walls thereof being spaced apart from the corresponding walls of shield member 15.

Because of the spacing between the walls of the receptacle 17 and the walls of the shield member 15 regions of relatively dead air are provided adjacent the side and bottom walls of receptacle 17 which impede the transfer of heat from the walls of the compartment 11 and the bodies stored therein to the receptacle 17. Therefore the interior of receptacle 17 will be maintained at a lower temperature than if the walls thereof were exposed to circulating air currents within the storage compartment 11. This result is explained by the fact that a substantial amount of the heat absorbed by the receptacle 17, when no baffle is provided, is by means of convection from the circulating box air. The transfer of heat by convection is reduced by the provision of the aforementioned regions of relatively dead air. However, heat is also transferred, by radiation, from the articles within the refrigerator and the refrigerator walls to the receptacle 17. The shield member 15 also serves to reduce the amount of heat transferred to the receptacle 17 in this manner. The spacing between the bottom walls of shield member 15 and receptacle 17 may be large enough to accommodate the drip water normally incident to defrosting. Cover 18 may be shaped to direct the drip water falling thereon into the combined shield member and drip tray 15 and, as illustrated in Figs. 1 and 3, one or more of the walls of shield member 15 may be provided with adjustable damper portions 19 to permit regulation of the circulation of air around the receptacle 17 and consequently the temperature within the receptacle. It will be understood that with the damper portion closed there will be almost no circulation of air around the receptacle 17 so that a layer of relatively dead air is provided resulting in a minimum temperature within the receptacle for a given setting of the refrigeration control. If the damper is wide open, a substantial circulation of air is permitted through the space between the shield member 15 and the receptacle 17 and a maximum temperature for the refrigeration control setting is obtained. A temperature in between the maximum and minimum may be obtained by varying the positions of the dampers and therefore the amount of air permitted to circulate in contact with the receptacle.

Describing the illustrated embodiment of my invention in greater detail, I have shown in the drawing a shelf 16 suitably supported in compartment 11 and arranged with a depressed portion 20 to receive and support the combined drip tray and shield member 15 below and adjacent to the cooling unit 14. As illustrated in Fig. 2, the food storage receptacle is suitably supported within the member 15 as on angle pieces 21 suitably secured within member 15. The food storage receptacle 17 is dimensioned so that when thus supported within the member 15 the walls of receptacle 17 will be spaced from the corresponding walls of member 15. As explained above, the supporting members or angles 21 are above the bottom wall of member 15 to permit the accumulation therein of the drip water normally incident to defrosting of the cooling unit 14 without wetting receptacle 17.

In order to make the receptacle 17 conveniently removable from the member 15 I have provided an opening 22 in the front wall of the member 15. The food receptacle 17 has been provided with a decorative front 23 suitably secured to the front wall of receptacle 17 as by means of studs 24 suitably secured to the front 23 and the front wall of the receptacle 17. The studs 24 should be long enough to maintain the front wall of receptacle 17 in the proper spaced relationship with respect to the front wall of the shield member 15, the front 23 being considered in this form of my invention as part of the front wall of member 15. A handle 25 is provided for convenience in removing the receptacle 17 or inserting the receptacle into the member 15.

A food supporting rack 26 is provided within the receptacle 17 in order to support food stored therein above the bottom wall of the receptacle. It may be desirable to provide ventilation for the receptacle 17 and accordingly I have provided a damper 27 which may be used to vary the extent of an opening 28 in a wall of the receptacle 17.

In order to prevent any drip from the cooling unit 14 falling into the interior of storage receptacle 17 and to permit maintenance of a relatively high humidity within the receptacle 17, I have provided a cover 18 for the receptacle 17 which may be shaped to direct any fluid falling thereon over the edges of the receptacle 17 whence it may fall to the bottom of the member 15.

In order to vary the circulation of air about the bottom and side walls of receptacle 17, I have provided the side walls of the member 15 with adjustable portions 19 suitably secured to the receptacle 15 as by means of hinges 29 spot-welded to the side walls of the member 15 as indicated by the numeral 30. In the arrangement illustrated, the hinge 29 is constructed to provide sufficient friction to maintain the portions 19 in the desired position although any desired method of positively positioning the portions 19 may be substituted.

Modifications will occur to those skilled in the art. For example, it is not essential that the shield member 15 be open at the front thereof. If desired, the receptacle 17 may be placed into the desired position through the open top of the member 15 although such an arrangement will necessitate removal of the combined drip tray and shield member 15 each time access to the receptacle 17 is desired. The side walls of the member 15 need not extend above the side walls of receptacle 17, as shown in Fig. 2, so that, if desired, the member 15 may be relatively shallow to serve as a drip tray and the receptacle 17 may be supported on top of the shield member 15 although with this arrangement the temperature control of receptacle 17 will be reduced. Furthermore, the cover 18 may be supported from the shield member 15 so that the receptacle 17 will be uncovered during the withdrawal of the receptacle 17 from the shield member 15. The receptacle and shield need not, necessarily, be placed below the cooling unit 14 although it is preferable that the receptacle and shield be adjacent thereto. If desired, gutters may be provided to conduct any drip water away from the opening 22 in the member 15 and the opening 28 in the receptacle 17.

While I have shown a particular embodiment of my invention in connection with a refrigerator of the household type, I do not desire my invention to be limited to the particular construction shown and described and I intend in the appended claims to cover all modifications within the spirit and scope of my invention.

What I claim as new and desire to secure by Letters Patent of the United States is:

1. In combination with a refrigerator having walls defining a food storage compartment and a cooling unit associated therewith, a food storage receptacle arranged in said compartment adjacent to said cooling unit and a shield member interposed between a portion of said receptacle and a portion of said food storage compartment, said shield member being spaced from said portion of said receptacle to provide a layer of relatively dead air between said portion of said receptacle and said shield.

2. In combination with a refrigerator having walls defining a food storage compartment and a cooling unit associated therewith, a food storage receptacle arranged in said compartment adjacent to said cooling unit and a shield member interposed between said receptacle and a portion of said food storage compartment, said shield member extending about substantial portions of the bottom and side walls of said receptacle in spaced relation thereto to provide a layer of relatively dead air between said portions of said receptacle and said shield.

3. In a refrigerator having walls defining a food storage compartment and a cooling unit associated therewith, the combination of a drip tray below and adjacent to said cooling unit, said tray having side and bottom walls, and a food storage receptacle disposed in said tray, said receptacle being maintained in spaced relationship with respect to the side and bottom walls of said tray whereby said tray serves as a shield member between said food storage receptacle and said food storage compartment.

4. In a refrigerator having walls defining a food storage compartment and a cooling unit associated therewith, the combination of a drip tray below and adjacent to said cooling unit, said tray having side and bottom walls, and a food storage receptacle disposed in said tray, said receptacle being maintained in spaced relationship with respect to the side and bottom walls of said tray whereby said tray serves as a shield member between said food storage receptacle and said food storage compartment, the top wall of said receptacle being arranged to direct any fluid falling thereon into said tray.

5. In combination with a refrigerator having walls defining a food storage compartment and a cooling unit associated therewith, a drip tray below and adjacent to said cooling unit, a food storage receptacle within said drip tray, said receptacle being maintained in spaced relationship with respect to the side and bottom walls of said tray, a wall of said tray having a portion thereof adjustable for varying the volume of air circulating in contact with said receptacle in order to control the temperature within said receptacle.

LEONARD W. ATCHISON.